(12) United States Patent
Urabe et al.

(10) Patent No.: US 8,474,858 B2
(45) Date of Patent: Jul. 2, 2013

(54) VEHICLE SEAT

(75) Inventors: Keiji Urabe, Kani (JP); Ryo Yasuda, Kariya (JP)

(73) Assignee: Toyota Boshoku Kabushiki Kaisha, Kariya-Shi (JP)

( * ) Notice: Subject to any disclaimer, the term of this patent is extended or adjusted under 35 U.S.C. 154(b) by 112 days.

(21) Appl. No.: 12/962,777

(22) Filed: Dec. 8, 2010

(65) Prior Publication Data

US 2011/0140396 A1 Jun. 16, 2011

(30) Foreign Application Priority Data

Dec. 11, 2009 (JP) ................................. 2009-281800

(51) Int. Cl.
*B60R 21/207* (2006.01)
*B60R 21/216* (2011.01)

(52) U.S. Cl.
USPC ................. 280/728.2; 280/728.3; 280/730.2; 297/216.13

(58) Field of Classification Search
USPC ................. 248/201, 205.1, 214, 215, 222.14; 280/728.2, 728.3, 730.2, 743.2; 297/216.13
See application file for complete search history.

(56) References Cited

U.S. PATENT DOCUMENTS

| | | | | |
|---|---|---|---|---|
| 5,749,597 A * | 5/1998 | Saderholm | ................. | 280/728.2 |
| 5,762,363 A * | 6/1998 | Brown et al. | ............. | 280/730.2 |
| 5,810,389 A * | 9/1998 | Yamaji et al. | ............. | 280/730.2 |
| 5,816,610 A * | 10/1998 | Higashiura et al. | ........ | 280/728.3 |
| 5,860,673 A * | 1/1999 | Hasegawa et al. | ......... | 280/730.2 |
| 5,938,232 A * | 8/1999 | Kalandek et al. | .......... | 280/730.2 |
| 5,967,546 A * | 10/1999 | Homier et al. | ............. | 280/730.2 |
| 5,967,603 A * | 10/1999 | Genders et al. | .......... | 297/216.13 |
| 5,988,674 A * | 11/1999 | Kimura et al. | ............. | 280/730.2 |
| 6,003,938 A * | 12/1999 | Lachat et al. | ............. | 297/216.13 |
| 6,095,602 A * | 8/2000 | Umezawa et al. | ......... | 297/216.1 |
| 6,206,410 B1 * | 3/2001 | Brown | ....................... | 280/728.3 |
| 6,237,934 B1 * | 5/2001 | Harrell et al. | ............. | 280/728.3 |
| 6,293,580 B1 * | 9/2001 | Lachat et al. | ............. | 280/728.3 |
| 6,352,304 B1 * | 3/2002 | Sorgenfrei | ............... | 297/216.13 |

(Continued)

FOREIGN PATENT DOCUMENTS

| | | |
|---|---|---|
| EP | 0559352 | 9/1993 |
| JP | 6-1177 | 1/1994 |

(Continued)

OTHER PUBLICATIONS

Japan Office action, mail date is Mar. 19, 2013.

*Primary Examiner* — Joseph Rocca
*Assistant Examiner* — Laura Freedman
(74) *Attorney, Agent, or Firm* — Greenblum & Bernstein, P.L.C.

(57) ABSTRACT

A vehicle seat is provided. A seat back of the vehicle seat includes: a cover member having a cleavage part; an airbag provided in the seat back; a bracket; and a reinforced cloth that is fixed to the frame member via the bracket, and that reinforces a part of the cover member different from the cleavage part. The airbag is caused to inflate from the cleavage part to protect an occupant's body in a range from an occupant's chest to waist. The reinforced cloth includes a first regulating part that covers a part of the airbag to be inflated toward the occupant's chest and a second regulating part that covers a part of the airbag to be inflated toward the occupant's waist. An attachment portion of the first regulating part and an attachment portion of the second regulating part are attached to the frame member at separate positions.

6 Claims, 6 Drawing Sheets

U.S. PATENT DOCUMENTS

| | | | |
|---|---|---|---|
| 6,357,789 B1 * | 3/2002 | Harada et al. | 280/730.2 |
| 6,364,348 B1 * | 4/2002 | Jang et al. | 280/730.2 |
| 6,382,665 B2 * | 5/2002 | Holdampf et al. | 280/730.2 |
| 6,386,577 B1 * | 5/2002 | Kan et al. | 280/730.2 |
| 6,439,597 B1 * | 8/2002 | Harada et al. | 280/728.2 |
| 6,450,528 B1 * | 9/2002 | Suezawa et al. | 280/730.2 |
| 6,543,803 B1 * | 4/2003 | Harada et al. | 280/730.2 |
| 6,612,610 B1 * | 9/2003 | Aoki et al. | 280/730.2 |
| 7,134,685 B2 * | 11/2006 | Panagos et al. | 280/730.2 |
| 7,232,150 B2 * | 6/2007 | Nagayama | 280/730.2 |
| 7,331,601 B2 * | 2/2008 | Tracht | 280/730.2 |
| 7,341,275 B2 * | 3/2008 | Miyake et al. | 280/730.2 |
| 7,377,542 B2 * | 5/2008 | Tracht et al. | 280/730.2 |
| 7,458,603 B2 * | 12/2008 | Buono et al. | 280/728.2 |
| 7,543,847 B2 * | 6/2009 | Tracht | 280/730.2 |
| 7,562,902 B2 * | 7/2009 | Osterhout | 280/730.2 |
| 7,669,889 B1 * | 3/2010 | Gorman et al. | 280/730.2 |
| 7,677,596 B2 * | 3/2010 | Castro et al. | 280/730.2 |
| 7,695,004 B2 * | 4/2010 | Inoue | 280/730.2 |
| 7,695,064 B2 * | 4/2010 | Thomas et al. | 297/216.16 |
| 7,883,105 B2 * | 2/2011 | Smith | 280/730.2 |
| 2006/0113765 A1 * | 6/2006 | Tracht | 280/730.2 |
| 2008/0258440 A1 * | 10/2008 | Muller | 280/728.3 |
| 2012/0038131 A1 * | 2/2012 | Muller et al. | 280/728.2 |

FOREIGN PATENT DOCUMENTS

| | | |
|---|---|---|
| JP | 9-150707 | 6/1997 |
| JP | 10-086722 | 4/1998 |
| JP | 10-181502 | 7/1998 |
| JP | 11-129856 | 5/1999 |
| JP | 2001-341607 | 12/2001 |
| JP | 2002-067857 | 3/2002 |
| JP | 2007-45262 | 2/2007 |
| JP | 2008-30557 | 2/2008 |
| JP | 2008-037261 | 2/2008 |
| JP | 2009-67151 | 4/2009 |
| JP | 2011-093479 | 5/2011 |

* cited by examiner

VEHICLE SEAT

BACKGROUND OF THE INVENTION

1. Field of the Invention

The present invention relates to a vehicle seat having a large-size airbag for protecting an occupant's body in a range from the chest to the waist.

2. Description of the Related Art

JP-A 2007-45262 describes the vehicle seat having a large-size airbag for protecting an occupant's body in a range from the chest to the waist. This vehicle seat includes a seat cushion and a seat back, which have a frame member configuring a seat frame, a cushion member configuring an external appearance of the seat, and a cover member which has a bag-like shape to cover the cushion member.

The seat back has a large-size airbag and related configurations (a cleavage part, reinforced cloth and a bracket) thereof. The cleavage part is a weak part of the cover member formed at a sitting side and allows the large-size airbag to inflate. The reinforced cloth is a cloth having a size corresponding to the large-size airbag (i.e., relatively large cloth) and includes an attachment portion having a band shape (a width is narrow). The bracket is an approximately rectangular flat plate member (small) having a size corresponding to the attachment portion.

In the related art, the reinforced cloth is stitching-joined to a backside of the cover member, thereby reinforcing a part (another part of the cover member) of the cover member except the cleavage part. Then, the attachment portion of the cloth is fixed to the frame member via the bracket.

In response to shock resulting from a vehicle collision, the large-size airbag inflates from the cleavage part, thereby protecting an occupant's body in a range from the chest to the waist (relatively large part of the body). At this time, it is possible to inflate the large-size airbag from the cleavage part by regulating an inflation direction of the airbag (reinforcing a part of the cover member with the reinforced cloth) to concentrate the stress on the cleavage part.

According to the related art, it is possible to attach the reinforced cloth to the frame member while performing a covering operation of the cover member. At this time, the reinforced cloth is attached to a part of the cover member and the bracket is fixed to the attachment portion. Then, the cover member having a bag-like shape is first turned inside out and then covered to the seat back while gradually turning it inside out again. While performing the covering operation, the (small) bracket attached with the reinforced cloth is fixed to the frame member behind the seat.

In the related art, the bracket is small compared to the reinforced cloth, so that the reinforced cloth and the bracket are unbalanced. Therefore, the attachment stability of the reinforced cloth is relatively low. As a result, the inflation direction of the airbag may not be regulated.

To solve this problem, it is conceivable to make the bracket larger. However, in that case, the covering operation of the cover member would be interrupted by the large bracket having the reinforced cloth attached thereto, so that the operation of attaching the reinforced cloth is troublesome (workability is deteriorated).

SUMMARY OF THE INVENTION

The present invention has been made in view of the above circumstances. Accordingly, an aspect of the present invention is to provide a vehicle seat in which a reinforced cloth can be attached with good workability while securing the attachment stability of the reinforced cloth.

According to an illustrative embodiment of the present invention, there is provided a vehicle seat comprising a seat back. The seat back includes: a frame member that configures a frame of the seat back; a cover member having a bag-like shape to cover the frame member; a cleavage part provided in the cover member; an airbag provided in the seat back; a bracket; and a reinforced cloth that is fixed to the frame member via the bracket, and that reinforces a part of the cover member different from the cleavage part. The seat back is configured such that the airbag is caused to inflate from the cleavage part to protect an occupant's body in a range from an occupant's chest to waist, in response to shock resulting from a vehicle collision. The reinforced cloth includes a first regulating part that covers a part of the airbag to be inflated toward the occupant's chest and a second regulating part that covers a part of the airbag to be inflated toward the occupant's waist. An attachment portion of the first regulating part and an attachment portion of the second regulating part are attached to the frame member at separate positions.

According to the above configuration, a plurality of regulating parts (attachment portions) are provided correspondingly to a large-size airbag. Furthermore, the attachment stability of the reinforced cloth is secured by individually attaching the plurality of attachment portions to the bracket.

Additionally, the plurality of attachment portions can be individually attached to the bracket in sequence. Therefore, when covering the cover member, it is possible to improve a handling performance of the bracket.

In the above configuration, the bracket may include a first bracket which allows the attachment portion of the first regulating part to be attached to the frame member, and a second bracket which allows the attachment portion of the second regulating part to be attached to the frame member, and the first bracket is a separate member from the second bracket.

According to this configuration, the bracket is divided into the plurality of brackets, so that a size of each bracket can be made to correspond to a size of each attachment portion. In addition, it is possible to perform an operation of attaching the brackets and the attachment portions to the frame member in the same sequence as the conventional attaching operation.

In the above configuration, at least one of the attachment portion of the first regulating part and the attachment portion of the second regulating part may be provided with a hook portion, and the bracket may be provided with a hooked portion with which the hook portion is engaged.

According to this configuration, the hook portion is engaged with the hooked portion (which is a relatively simple operation), so that one of the regulating parts can be attached to the bracket.

According to another illustrative embodiment of the present invention, there is provided a vehicle seat comprising a seat back. The seat back includes: a frame member that configures a frame of the seat back; an airbag that is provided in the seat back and that is configured to inflate; a cover member that covers the frame member and includes a cleavage part though which the airbag inflates; a bracket fixed to the frame member; and a reinforced cloth that is attached to the bracket, and that reinforces a part of the cover member different from the cleavage part, the reinforced cloth including a first regulating part that covers a first part of the airbag to be inflated toward a first area and a second regulating part that covers a part of the airbag to be inflated toward a second area different from the first area. The first regulating part is attached to the bracket at a first position and the second regulating part is attached to the bracket at a second position separate from the first position.

BRIEF DESCRIPTION OF THE DRAWINGS

In the accompanying drawings:

FIGS. 3A and 3B are perspective views of the vehicle seat showing an operation of covering a cover member, wherein FIG. 3A is a view showing a state where the cover member is covered in the course of the covering operation and FIG. 3B is a view showing a state where the reinforced cloth and the bracket are attached to a frame member;

DETAILED DESCRIPTION

Figure 1:
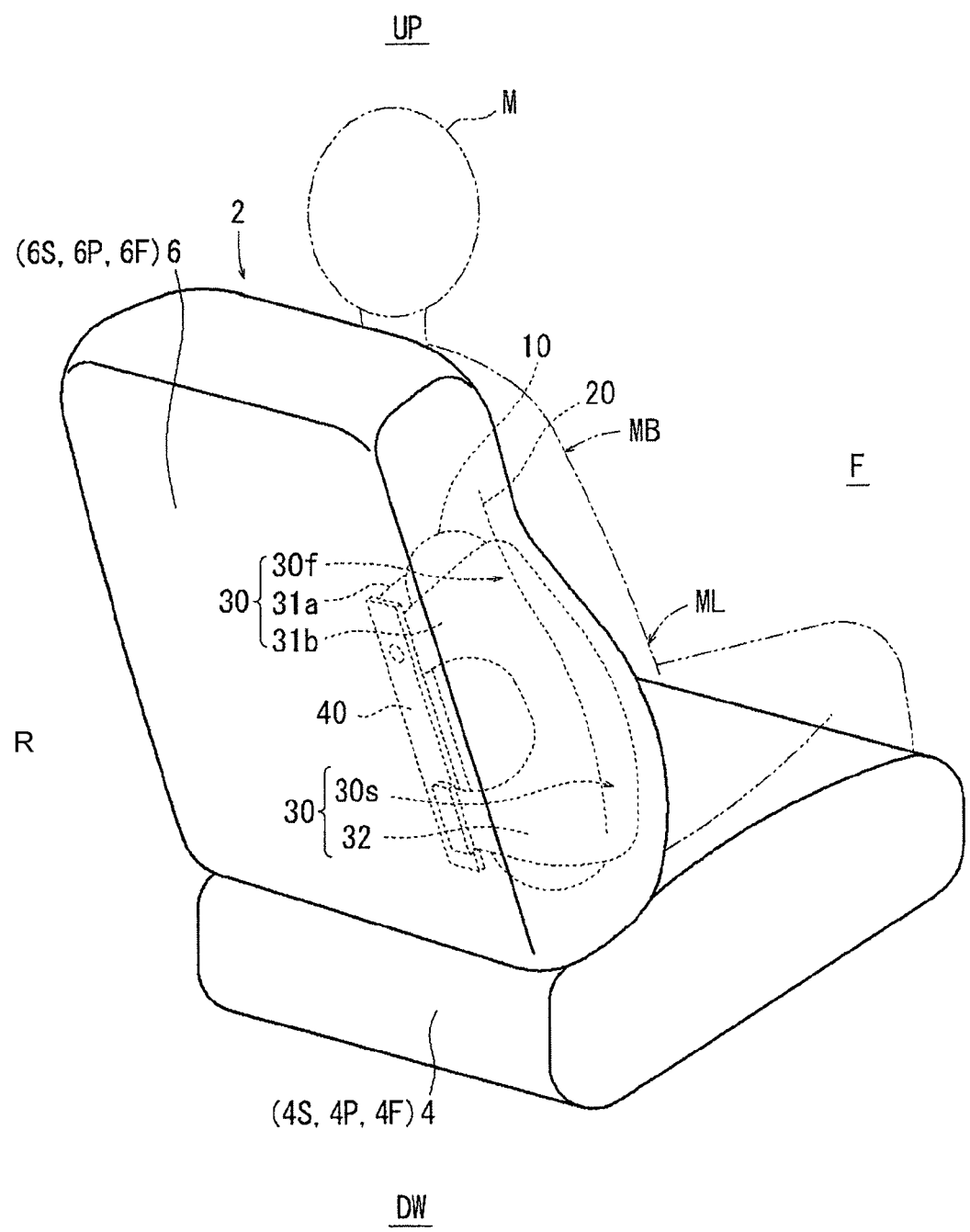
FIG. 1 is a perspective view of a vehicle seat according to a first illustrative embodiment of the present invention.

Hereinafter, illustrative embodiments of the present invention will be described with reference to FIGS. 1 to 6. In each of the drawings, the front side of a vehicle seat is indicated with a reference numeral F, the rear side of the vehicle seat is indicated with a reference numeral B, the upper side of the vehicle seat is indicated with a reference numeral UP and the lower side of the vehicle seat is indicated with a reference numeral DW.

A vehicle seat 2 shown in FIG. 1 includes a seat cushion 4 and a seat back 6 that is connected to the seat cushion 4 to be movable between an erected position and a laid down position. These seat configurations have a frame member 4F(6F) configuring a seat frame, a cushion member 4P(6P) configuring an external appearance of the seat and a cover member 4S(6S) that covers the cushion member, respectively.

[First Illustrative Embodiment]

The seat back 6 has the above-described basic configuration, a large-size airbag 10 and related configurations including a cleavage part 20, a reinforced cloth 30 and a bracket 40 (refer to FIGS. 1 to 4), which will be described later.

In response to shock due to a vehicle collision, the large-size airbag 10 inflates from the cleavage part 20, thereby protecting an occupant's body in a range from the chest to the waist (relatively large part of the body).

At this time, in this illustrative embodiment, an inflation direction of the large-size airbag is regulated (a part of the cover member except the cleavage part 20 is reinforced with the reinforced cloth 30), so that the large-size airbag 10 is inflated from the cleavage part 20. In the configuration of this type, it is preferable to attach the reinforced cloth 30 with good workability while securing the attachment stability of the reinforced cloth 30 (while regulating the inflation direction of the large-size airbag more certainly).

In this illustrative embodiment, the attachment stability of the reinforced cloth 30 is secured by the following configuration.

(Basic Configuration)

The seat back 6 is provided with the large-size airbag 10 and the related configurations 20, 30, 40 (refer to FIGS. 1 to 4).

In this illustrative embodiment, a plurality of cover members is stitched into a bag-like shape to form the cover member 6S, and the cleavage part 20 may be provided to a sitting side of the cover member 6S (refer to FIG. 1).

The frame member 6F has a side frame 16 of a flat plate shape (refer to FIG. 3). The side frame 16 has an attachment hole (not shown) for fitting a bolt member B, and a bracket 40 (described later) can be attached to the side frame.

The cushion member 6P has a plurality of holes (a first hole H1, a second hole H2 and a third hole H3) (refer to FIG. 3).

The first hole H1 and the second hole H2 are through-holes that are vertically arranged in a line (when the seat is erected) and penetrate from a side of the seat to a rear side (one side of the frame member 6F). In addition, the third hole H3 is a through-hole (gap) that is formed at the same height as the first hole H1 (when the seat is erected) and penetrates from the sitting side to the rear side (the other side of the frame member 6F).

(Large-size Airbag)

The large-size airbag 10 is a member of an approximately cubic shape and an overall length is about 10 mm~100 mm (relatively long) (refer to FIG. 1) under non-inflation state. The large-size airbag 10 is inflated in response to shock resulting from a vehicle collision, thereby protecting an occupant's body in a range from the chest MB to the waist ML (relatively large body part).

In this illustrative embodiment, the large-size airbag 10 under non-inflation state is arranged in the cushion member 6P. Although a position of arranging the large-size airbag 10 is not particularly limited, the large-size airbag 10 may be arranged at a side part of the seat back 6 (an interior of a top plate side part and the like).

Figure 4:
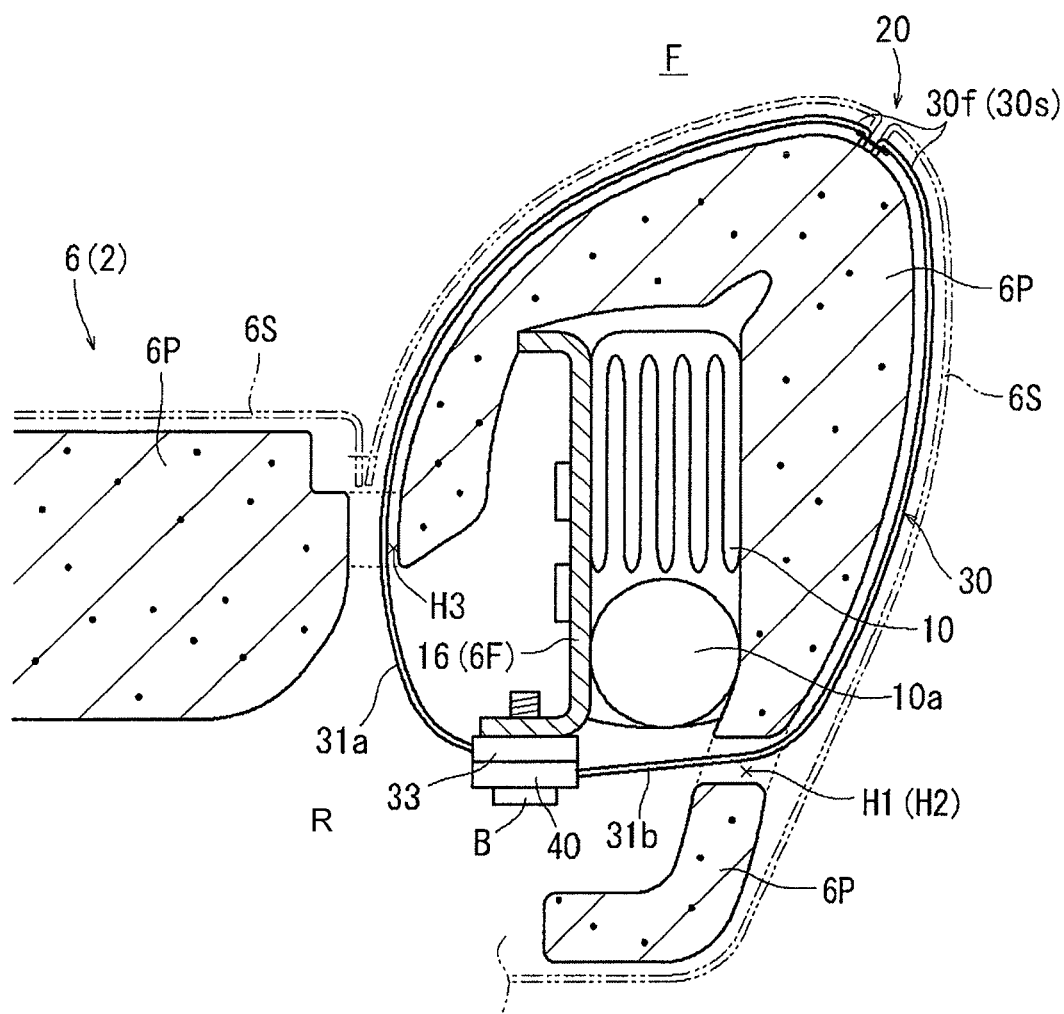
FIG. 4 is a cross sectional view of a part of a seat back according to the first illustrative embodiment.

Further, it may be advantageous that a front part of the large-size airbag 10 is not covered by the cushion member 6P or is covered by the relatively thin cushion member 6P (for example, a seam) (refer to FIG. 4). The large-size airbag 10 may communicate with an air supply unit (an inflator 10a shown in FIG. 4) or may have a gas generating agent filled therein.

(Cleavage Part)

The cleavage part 20 is a weak part of the cover member 6S that is provided to a side part of the seat and may be cloven (opened) by inflation of the large-size airbag 10 (refer to FIGS. 1 and 4).

In this illustrative embodiment, the cleavage part 20 is formed as a recess shape which extends in a vertical direction (when the seat is erected). For example, a weak seamed part (cleavage part 20) may be formed by seaming neighboring pieces of the sitting side in an internally folded back shape (a shape in which the exterior is inwardly folded). The cleavage part 20 may be formed at the sitting side of the seat back (for example, a center of the top plate side part), correspondingly to an inflation direction of the large-size airbag 10 (refer to FIG. 4).

(Reinforced Cloth)

Figure 2A:
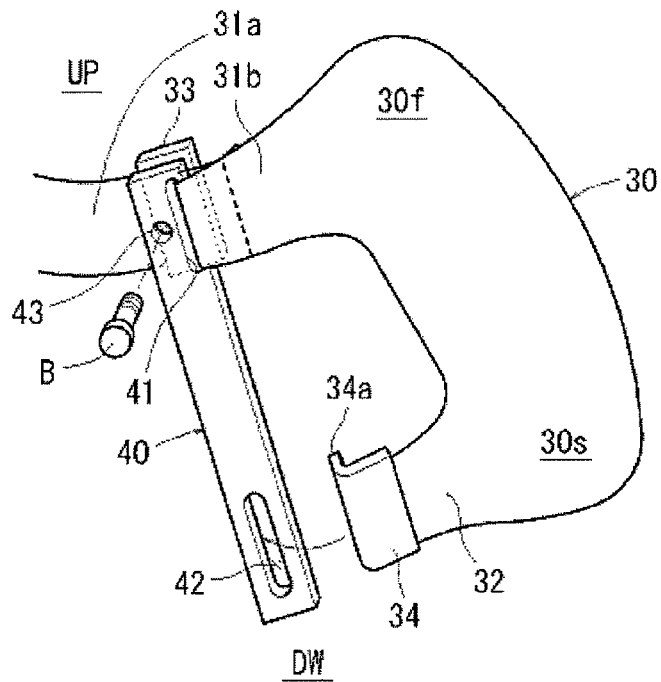
FIG. 2A is a perspective view of a reinforced cloth and a bracket according to the first illustrative embodiment.

The reinforced cloth 30 is a cloth (fabric, knit, nonwoven fabric and the like) having a size corresponding to the large-size airbag 10 and has a first part 30f (an example of first regulating part) and a second part 30s (an example of second regulating part) (refer to FIGS. 1, 2A and 4).

In this illustrative embodiment, the reinforced cloth 30 is arranged to a backside of the cover member 6S to regulate the inflation direction of the large-size airbag 10 (i.e., to reinforce a part of the cover member with the reinforced cloth), thereby concentrating stress on the cleavage part 20. Another part of the cover member may be a cover member part of a side of the seat back 6 or a sitting surface (top plate side part) (refer to FIG. 4).

(First Regulating Part)

The first part 30f (an example of first regulating part) is a part that covers an airbag part inflating toward the occupant's chest MB (first area). In this illustrative embodiment, the first part 30f has a pair of first attachment portions 31a, 31b (both of which have a band shape of a narrow width) and a first engagement portion 33.

The first engagement portion 33 (a member having a flat plate shape) has a hole (not shown) into which the bolt member B can be inserted and is attached to an end part of the first attachment portion 31a.

(Second Regulating Part)

The second part 30s (an example of second regulating part) is a part that covers an airbag part inflating toward the occupant's waist ML (second area). In this illustrative embodiment, the second part 30s has a second attachment portion 32 (which has a band shape of a narrow width) and a second engagement portion 34.

The second engagement portion 34 (a member having a flat plate shape) has a hook portion 34a and is attached to an end part of the second attachment portion 32. The hook portion 34a may be formed by bending the end part of the second engagement portion 34 into a substantially J-shape (when seen from a sectional view), for example (i.e., it can be relatively easily formed).

In this illustrative embodiment, the first part 30f and the second part 30s are seamed to seaming sections (both ends of the cleavage part 20) of the cover part so that the cleaving of the cleavage part 20 is not interrupted (refer to FIGS. 1 and 4). Then, the first part 30f is arranged only at a side face (upper side) or sitting face (top plate side part) of the seat back 6 and the second part 30s is arranged at a side face (lower side) of the seat back 6.

In addition, regarding the cover member 6S during the erection of the seat (normal state), the first part 30f configures an upper side of the reinforced cloth 30 and the second part 30s configures a lower side of the reinforced cloth 30 (refer to FIG. 1). By turning the cover member 6S inside out (when performing an operation of covering the cover member), the first part 30f is arranged at the lower side and the second part 30s is arranged at the upper side (refer to FIGS. 1 and 3).

(Bracket)

The bracket 40 is a relatively long plate member in a longitudinal direction and has a length corresponding to the large-size airbag 10 (refer to FIG. 1). In this illustrative embodiment, the bracket 40 has a plurality of attached portions (a first long hole 41, a second long hole 42 and an insertion hole 43).

One end of the bracket 40 (first position) is formed with a first long hole 41 into which the first attachment portion 31b can be inserted and an insertion hole 43, into which the bolt member B can be inserted.

In addition, the other end of the bracket 40 (second position) is formed with a second long hole 42 into which the second engagement portion 34 can be inserted. The second long hole 42 (which is an example of a hooked portion) is a through-hole into which the hook portion 34a can be inserted and engaged.

In this illustrative embodiment, after the first attachment portion 31b is inserted into the first long hole 41, the tip end of the first attachment portion 31b is pulled out. By stitching and fixing the end part of the first attachment portion 31b to a part of the first attachment portion 31b, the first attachment portion 31b is fixed to the one end of bracket 40.

[Covering Operation of Cover Member]

Figure 3A:
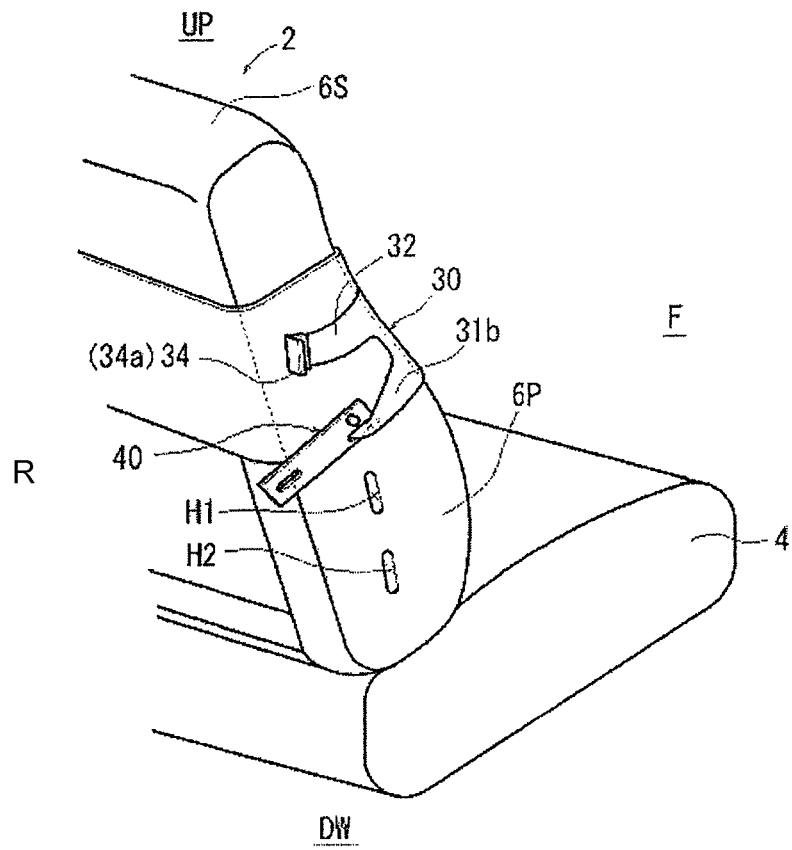
Figure 3B:
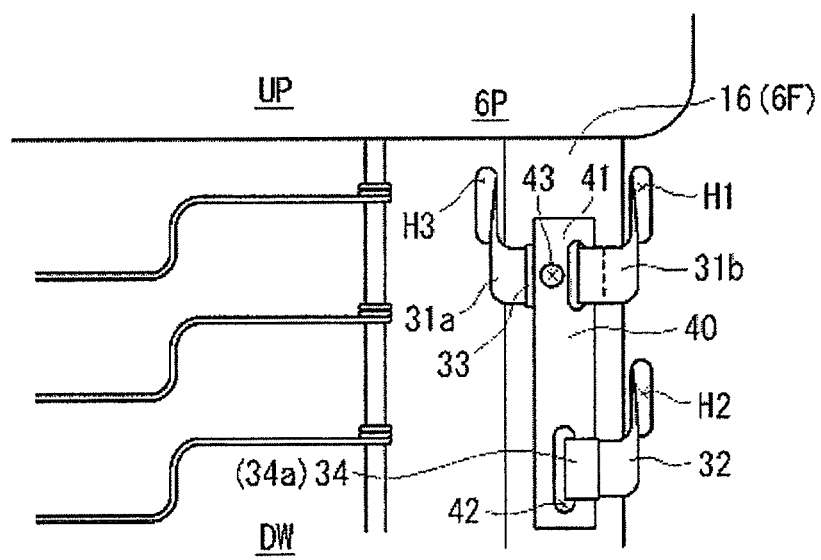

As shown in FIGS. 3A, 3B and 4, the reinforced cloth 30 is attached to the side frame 16 via the bracket 40 while performing the operation for covering the cover member 6S. At this time, the cover member 6S is first turned inside out and is then covered to the cushion member 6P while gradually turning it inside out again.

In the course of covering the cover member 6S (the cover member is half-turned inside out), the one end of the bracket 40 and the first attachment portion 31b are pulled out to the rear side of the seat through the first hole H1. At this time, a direction of the other end of the bracket 40 can be relatively freely changed because the second attachment portion 32 is not attached yet. Therefore, the bracket 40 can be inserted into the first hole H1 with good workability.

Then, the first engagement portion 33 is pulled out to the rear side of the seat through the third hole H3. The one end of the bracket 40 and the first engagement portion 33 are overlapped over the side frame 16, which are then together fixed by inserting the bolt member B. Thus, the first attachment portions 31a, 31b can be fixed to the side frame 16.

Then, at a state where the cover member 6S is further externally turned inside out, the second engagement portion 34 is pulled out to the rear side of the seat through the second hole H2. Then, the hook portion 34a is inserted into the second long hole 42 (hooked portion) and is thus engaged to a peripheral edge of the second long hole 42. Thus, the second attachment portion 32 can be fixed to the side frame 16.

As described above, according to this illustrative embodiment, correspondingly to the large-size airbag 10, both the reinforced cloth 30 and the bracket 40 are made large-size, so that the reinforced cloth 30 and the bracket 40 are balanced. Furthermore, the first attachment portions 31a, 31b and the second attachment portion 32 are individually or separately attached to the bracket 40, so that the attachment stability of the reinforced cloth 30 is secured.

In this illustrative embodiment, it is possible to individually attach the plurality of attachment portions 31a (31b), 32 to the bracket 40 in sequence. Therefore, when performing the operation of covering the cover member 6S, it is possible to secure handling performance of the bracket 40. Accordingly, it is possible to attach the reinforced cloth 30 to the side frame 16 with good workability.

That is, according to this illustrative embodiment, it is possible to attach the reinforced cloth 30 with good workability while securing the attachment stability of the reinforced cloth 30 (regulating the inflation direction of the large-size airbag 10 more certainly).

[Modified Illustrative Embodiment]

Figure 2B:
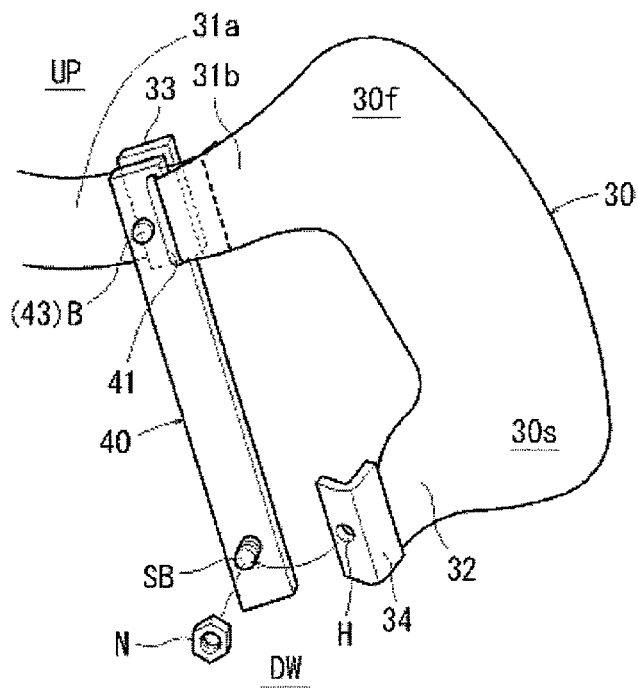
FIG. 2B is a perspective view of the reinforced cloth and the bracket according to a modified illustrative embodiment.

As shown in FIG. 2B, according to a modified illustrative embodiment, a stud bolt part SB is mounted to the other end of the bracket 40. The stud bolt part SB is protruded at the other end of the bracket 40 toward the rear of the seat. In addition, the second engagement portion 34 is a flat plate member and has a hole H into which the stud bolt part SB can be inserted.

When performing the operation of covering the cover member 6S, the stud bolt part SB is inserted into the hole H of the second engagement portion 34 and then a nut member N is fitted on the stud bolt part, so that the second attachment portion 32 can be attached to the bracket 40.

[Second Illustrative Embodiment]

The basic configurations of the second illustrative embodiment are the same as those of the first illustrative embodiment. Thus, the same configurations are indicated with the corresponding reference numerals and the detailed description thereof will be omitted.

Figure 5:
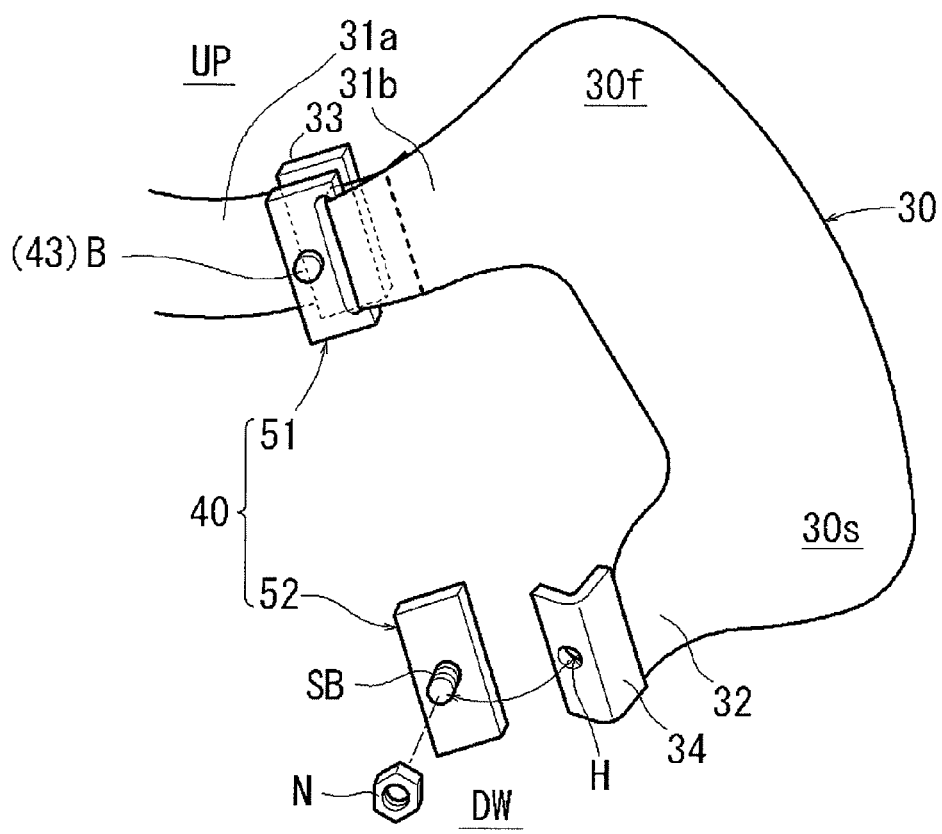
FIG. 5 is a perspective view of a reinforced cloth and a bracket according to a second illustrative embodiment.

The bracket 40 of this illustrative embodiment has a first bracket 51 and a second bracket 52 (refer to FIG. 5). The first bracket 51 is a member to which the first part 30f can be attached and has the first long hole 41 and the insertion hole 43. The first bracket 51 is a flat plate member having an approximately rectangular shape (when seen from the front) and has a length corresponding to the size of the first attachment portion 31b (relatively small).

In addition, the second bracket 52 is a member to which the second part 30s can be attached and has the stud bolt part SB. The second bracket 52 is also a flat plate member having an approximately rectangular shape (when seen from the front) and has a length corresponding to the size of the second attachment portion 32 (relatively small).

The side frame 16 can be formed with a pair of attachment holes (not shown) that are arranged in a line in a vertical direction of the seat (refer to FIG. 3). The first bracket 51 and the second bracket 52 are attached to the side frame 16 in parallel in a vertical direction of the seat.

In this illustrative embodiment, the first bracket 51 is pulled out to the rear side of the seat through the first hole H1 (refer to FIGS. 3 and 5). In addition, the second attachment portion 32 is pulled out to the rear side of the seat through the second hole H2. At this time, since each of the bracket 51, 52 is small, it is possible to insert the brackets through holes H1, H2, respectively smoothly.

As described above, in this illustrative embodiment, the reinforced cloth 30 has large size, correspondingly to the large-size airbag 10, and the plurality of attachment portions 31a, 31b are provided.

The plurality of brackets 51, 52 is used correspondingly to the plurality of attachment portions 31a, 31b, so that the reinforced cloth 30 and the bracket 40 are balanced. Furthermore, the attachment stability of the reinforced cloth 30 is secured by attaching both the first attachment portions 31a, 31b and the second attachment portion 32 to the bracket 40.

Here, each of the brackets 51, 52 may be made to have a size corresponding to the size of each attachment portion 31a, 31b. Accordingly, it is possible to perform the operation of attaching the respective attachment portions to the respective brackets 51, 52 in the same manner as the conventional attaching operation.

[Third Illustrative Embodiment]

The basic configurations of the third illustrative embodiment are the same as those of the first illustrative embodiment. Thus, the same configurations are indicated with the corresponding reference numerals and the detailed description thereof will be omitted.

Figure 6:
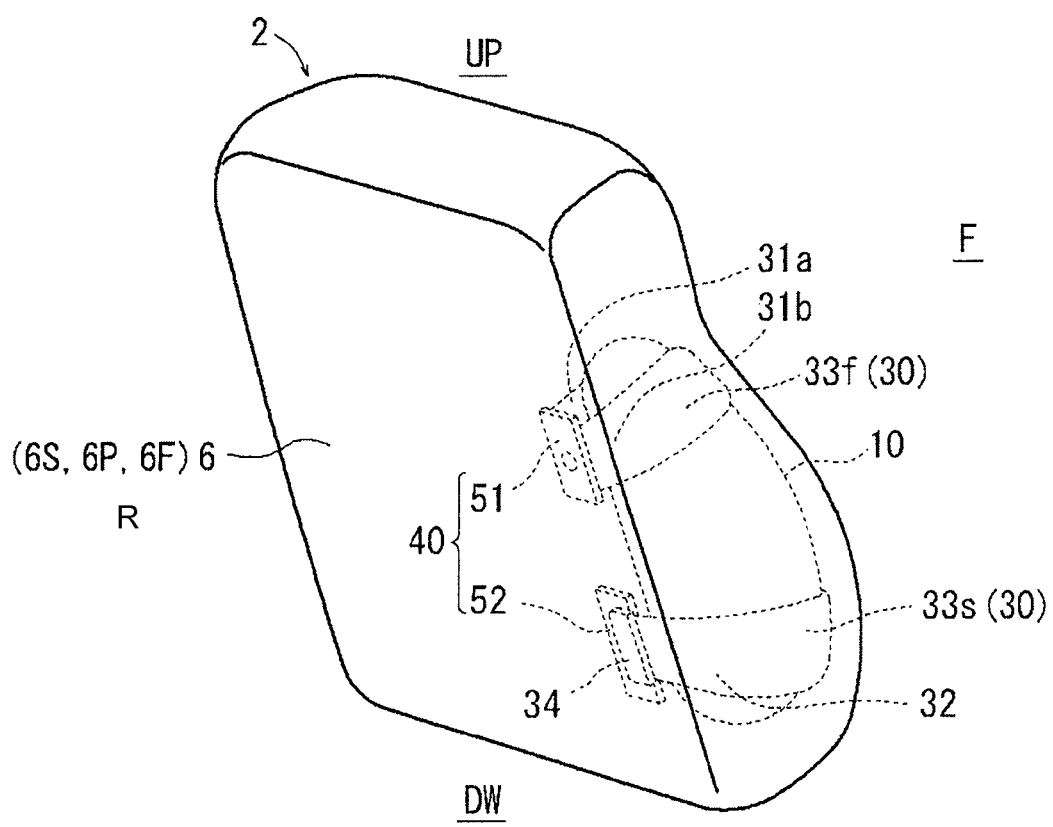
FIG. 6 is a perspective view of a seat back according to a third illustrative exemplary.

As shown in FIG. 6, the reinforced cloth 30 has a first reinforced cloth 33f (an example of first regulating part) and a second reinforced cloth 33s (an example of second regulating part). The first reinforced cloth 33f has a pair of first attachment portions 31a, 31b, both of which have a band shape of a narrow width, and the first engagement portion 33. In addition, the second reinforced cloth 33s has the second attachment portion 32, which has a band shape of a narrow width, and the second engagement portion 34.

Additionally, the bracket 40 has the first bracket 51 and the second bracket 52. The first bracket 51 and the second bracket 52 are attached to the side frame 16 in parallel with space therebetween in a vertical direction of the seat.

As described above, in this illustrative embodiment, correspondingly to the large-size airbag 10, the plurality of reinforced clothes 33f, 33s and the plurality of brackets 51, 52 are used, so that the reinforced clothe 30 and the bracket 40 are balanced. Furthermore, the first attachment portions 31a, 31b and the second attachment portion 32 are individually attached to the brackets 51, 52, so that the attachment stability of the reinforced clothes 30 is secured.

Additionally, in this illustrative embodiment, since a reinforced cloth and a bracket having the conventional configurations can be used, it is possible to reduce the manufacturing cost of each member.

While the present invention has been shown and described with reference to certain exemplary embodiments thereof, it will be understood by those skilled in the art that various changes in form and details may be made therein without departing from the spirit and scope of the invention as defined by the appended claims.

(1) In the above-described illustrative embodiments, the various attachment configurations of the second engagement portion 34 and the bracket 40 have been described. However, the present invention is not limited to those attachment configurations. That is, in the first to third illustrative embodiments, the hook portion 34a and the long hole 42 are engaged. However, it may be possible that a stub bolt part and a hole are fitted. In addition, in the modified first illustrative embodiment and the second illustrative embodiment, the stub bolt part SB and the hole H are fitted. However, the hook portion and the second long hole may be engaged.

Furthermore, it may be possible that the second attachment portion has an engagement portion having a key shape and the bracket has an engaged portion having a key hole shape into which the engagement portion can be inserted (for example, see JP-A-Hei.6-1177). In addition, the attachment portion may be attached to the bracket by inserting the engagement portion into the engaged portion.

The engagement portion may have a protrusion (which has a cylindrical shape) that protrudes from the second attachment portion (which has a flat plate shape), a tongue forming portion that extends from a tip end of the protrusion and a first recess portion that is formed at the protrusion. The first recess portion is a recessed portion that is arranged at both sides of the protrusion. The tongue forming portion is a flat plate portion having a rectangular shape (when seen from a front) and is opposed to one surface of the second attachment portion. A second recess portion is formed between the one surface of the second attachment portion and the tongue forming portion.

In addition, the engaged portion may have a first circular hole that corresponds to the protrusion and a second rectangular hole that corresponds to the tongue forming portion. One end of the second hole communicates with the first hole.

After inserting the engagement portion into the engaged portion, the protrusion is moved to the second hole from the first hole. At this time, edges of both sides of the second hole are fitted to the first recess portion and an edge of the other end of the second hole is kept in the second recess portion. Thereby, the engagement portion can be inserted and engaged to the engaged portion.

(2) In the above-described illustrative embodiments, the first attachment portion 31a is together fixed to the bracket 40. However, the present invention is not limited to this attachment configuration. In other words, as the attachment configuration of the first attachment portion 31a and the bracket 40, an engagement configuration of the hook portion and the second long hole or a fitting configuration of the stud bolt portion and the hole may be used.

Additionally, in the above-described illustrative embodiments, the first attachment portion 31b is stitched and attached to the bracket 40. However, the present invention is not limited to this attachment configuration. In other words, as the attachment configuration of the first attachment portion and the bracket, an engagement configuration of the hook portion and the second long hole or a fitting configuration of the stud bolt portion and the hole may be used. Further, in the above-described illustrative embodiment, the first attachment portion 31b has been already attached to the bracket 40. However, the first attachment portion 31a may be attached to the bracket 40 in advance.

(3) In the above-described illustrative embodiments, the bracket 40 is attached to the side frame 16. However, the present invention is not limited to the attachment configuration of the bracket 40. In other words, the bracket may be attached to the constitutional elements of the frame member directly or via another member (indirectly).

(4) Additionally, in the above-described illustrative embodiments, the reinforced cloth 30 having the first regulating part and the second regulating part has been described. However, the present invention is not limited to the configuration of the reinforced cloth. In other words, one or more intermediate regulating member means may be provided between the first regulating part and the second regulating part. In addition, a third attachment portion may be provided to the intermediate regulating member.

(5) Additionally, in the above-described illustrative embodiments, the attachment holes are formed at the side frame 16. However, the present invention is not limited to the configuration of the side frame. For example, it may be possible that a stud bolt portion is provided to the side frame and a hole into which the stud bolt portion can be inserted is formed at the bracket.

(6) Additionally, the bracket may be made to be large, correspondingly to the large-size airbag, and a plurality of attached portions is provided to the bracket. Furthermore, a plurality of reinforced clothes may be individually attached to the bracket.

(7) Additionally, in the first illustrative embodiments, a single reinforced cloth 30 and a single bracket 40 are used, in the second illustrative embodiments, a single reinforced cloth 30 and plural brackets 51, 52 are used, and in the third illustrative embodiment, plural reinforced cloths 33f, 33s and plural brackets 51, 52 are used, respectively. However, the present invention is not limited thereto. For example, plural reinforced cloths and a single bracket may be used.

What is claimed is:

1. A vehicle seat comprising a seat back, the seat back including:
   a frame member that configures a frame of the seat back;
   a cover member having a bag shape to cover the frame member;
   a cleavage part provided in the cover member;
   an airbag provided in the seat back;
   a bracket; and
   a reinforced cloth that is fixed to the frame member via the bracket, and that reinforces a part of the cover member different from the cleavage part,
   wherein the seat back is configured such that the airbag is caused to inflate from the cleavage part to protect an occupant's body in a range from an occupant's chest to waist, in response to shock resulting from a vehicle collision,
   wherein the reinforced cloth includes a first regulating part that covers a part of the airbag to be inflated toward the occupant's chest and a second regulating part that covers a part of the airbag to be inflated toward the occupant's waist,
   wherein an attachment portion of the first regulating part and an attachment portion of the second regulating part are attached to the frame member at separate positions, and
   wherein at least one of the attachment portion of the first regulating part and the attachment portion of the second regulating part is provided with a hook portion, and wherein the bracket is provided with a hooked portion with which the hook portion is engaged.

2. The vehicle seat according to claim 1, wherein the bracket includes a first bracket which allows the attachment portion of the first regulating part to be attached to the frame member, and a second bracket which allows the attachment portion of the second regulating part to be attached to the frame member, and
   wherein the first bracket is a separate member from the second bracket.

3. The vehicle seat according to claim 2, wherein at least one of the first bracket and the second bracket is provided with the hooked portion with which the hook portion is engaged.

4. A vehicle seat comprising a seat back, the seat back including:
   a frame member that configures a frame of the seat back;
   an airbag that is provided in the seat back and that is configured to inflate;
   a cover member that covers the frame member and includes a cleavage part through which the airbag inflates;
   a bracket fixed to the frame member; and
   a reinforced cloth that is attached to the bracket, and that reinforces a part of the cover member different from the cleavage part, the reinforced cloth including a first regulating part that covers a first part of the airbag to be inflated toward a first area and a second regulating part that covers a part of the airbag to be inflated toward a second area different from the first area,
   wherein the first regulating part is attached to the bracket at a first position and the second regulating part is attached to the bracket at a second position separate from the first position, and
   wherein the bracket has a longitudinal plate shape.

5. The vehicle seat according to claim 4, wherein the first position and the second position are separate from each other in a longitudinal direction of the bracket.

6. The vehicle seat according to claim 4, wherein the first regulating part is attached to the bracket with a bolt member, and wherein the second regulating part is attached to the bracket with a hook.

* * * * *